United States Patent [19]

Sandercock

[11] 4,355,903
[45] Oct. 26, 1982

[54] THIN FILM THICKNESS MONITOR

[75] Inventor: John R. Sandercock, Zurich, Switzerland

[73] Assignee: RCA Corporation, New York, N.Y.

[21] Appl. No.: 181,990

[22] Filed: Aug. 28, 1980

Related U.S. Application Data

[63] Continuation-in-part of Ser. No. 119,968, Feb. 8, 1980, abandoned.

[51] Int. Cl.³ .............................................. G01B 11/02
[52] U.S. Cl. .................................... 356/382; 356/243; 356/357
[58] Field of Search ............... 356/355, 357, 381, 382, 356/243

[56] References Cited

U.S. PATENT DOCUMENTS

| | | | |
|---|---|---|---|
| 2,331,027 | 10/1943 | Harrison | 356/243 |
| 2,338,981 | 1/1944 | Straub | 356/357 |
| 2,518,647 | 8/1950 | Teeple et al. | 356/357 |
| 2,578,859 | 12/1951 | Teeple et al. | 356/357 |
| 2,587,282 | 2/1952 | Blodgett | 356/357 |
| 2,655,073 | 10/1953 | Strickler et al. | 356/357 |
| 2,666,355 | 1/1954 | Trurnit | 356/357 |
| 3,319,515 | 5/1967 | Flournoy | 356/357 |
| 3,551,056 | 12/1970 | Fay et al. | 356/357 |
| 3,601,492 | 8/1971 | Reichard | 356/357 |
| 3,869,211 | 3/1975 | Watanabe et al. | 356/381 |

OTHER PUBLICATIONS

Konnerth et al., "In-Situ Measurement of Dielectric Thickness During Etching or Developing Processes", *IEEE Transactions on Electron Devices*, vol. Ed-22, No. 7, pp. 452–456, Jul. 1975.

Primary Examiner—R. A. Rosenberger
Attorney, Agent, or Firm—Birgit E. Morris; Donald S. Cohen; Joseph D. Lazar

[57] ABSTRACT

A thin film thickness monitor uses the successive reflection of polychromatic light from a reference or standard thin film having a varying optical thickness ($n_1t_1$) and then from a thin film of unknown thickness ($t_f$) or optical thickness ($n_ft_f$). The reflected intensity of light from the thin film is detected to provide a signal indicating when the optical thickness of the unknown film is equal to the optical thickness of the reference.

11 Claims, 8 Drawing Figures

THIN FILM THICKNESS MONITOR

This application is a continuation-in-part of my application, Ser. No. 119,968, filed Feb. 8, 1980 entitled "THIN FILM THICKNESS MONITOR," now abandoned.

This invention relates to thin film thickness monitors.

There are many applications both in industry and in research for an instrument to measure the thickness of thin films. Various devices are available commercially for this purpose. For example, surface profile monitors measure the step size at a point where the film has been etched through to the substrate, by tracking a stylus over the surface. The physical contact can distort or damage the surface so that a non-contact measurement method is in many cases desired. Methods based on the reflection of light from the film surface offer such a contactless probe.

There are essentially two distinct techniques for the optical determination of film thickness. The first, known as ellipsometry, measures and compares the reflection coefficient measured at a given wavelength and an angle of incidence for polarization perpendicular and parallel to the plane of incidence. Considerable computation is required and unambiguous results are obtained only if it is known a priori that the film thickness lies within a restricted range, usually 0 to about 3,000 Å. The second class of optical techniques is based on the wavelength and/or angle of incidence dependence of the reflectivity, observable as the well-known interference colors in thin films. Although the principle of this technique is simple, instruments based on this principle are not cheap even in the simplest instruments which do not even give a direct reading of the film thickness.

An optical thickness gauge that measures the thickness of transparent or semi-transparent sheet material, by the reflectivity technique used in the second class of prior art techniques described hereinabove, is described in U.S. Pat. No. 2,655,073 issued on Oct. 13, 1953 to A. Strickler and J. H. Teeple. This gauge reflects light from a specimen sheet material onto a rotatable flat optical reflector having parallel surfaces to form interference fringes when the reflected light beams are in phase. The flat optical reflector is rotated in the path of the reflected beam from the specimen beam to the angle at which the light beams are in phase to form the fringes for display on a mirror. The angle of rotation of the reflector is a measure of the thickness of the sheet material. This patent also describes the use of an optical wedge which is also used to form interference fringes when the reflected beams are in phase when the thickness of the optical wedge coincides with the thickness of the specimen.

According to the invention, a monitor for the thickness of thin films based on the reflectivity technique is provided with means to determine the optical film thickness utilizing the optical film thickness parameters of a reference or standard thin film having a varying optical thickness. Sequenced reflections of light from the standard and the unknown specimen are detected to provide a signal corresponding to the intensity of the light at which the optical thicknesses are equal.

Figure 1:
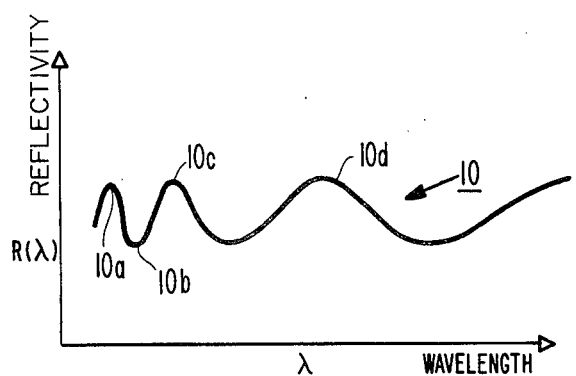
FIG. 1 is a plot of a curve of reflectivity vs. wavelength useful in understanding the background of the invention.

Before describing in detail an embodiment of the invention, the principle upon which the invention is based will be explained. Light incident on a thin film supported on a substrate (for example, a standard or reference thin film 16 shown in FIG. 2 to be described) is reflected partly from the film/air interface and partly from the substrate/film interface. As a result of the interference that occurs between two such reflected beams, including less significant but nevertheless existing additional interference resulting from multiple reflections within the film, the reflected intensity (I) will show an oscillatory dependence on the wavelength of the incident light. This is manifested as a curve (10) representing a set of reflections of different wavelengths as shown in FIG. 1.

For a film of thickness $t_f$ and refractive index $n_f$ on a substrate of higher refractive index $n_s$, i.e., $n_s > n_f$, the reflectivity as a function of wavelength [$R(\lambda)$] shows maxima for those wavelengths ($\lambda_p$) given by:

$$\lambda_p = \frac{2t_f}{p}(n_f^2 - \sin^2\theta)^{\frac{1}{2}} \qquad (1)$$

where $\theta$ is the angle of incidence; and p is any integer ("p" being known in the art as the order of interference).

Correspondingly, the reflectivity (R) shows minimum for half-integral values of p. The ratio of maximum to minimum reflectivity (R) depends on the refractive indices of both the film ($n_f$) and the substrate ($n_s$). When $n_s = n_f$ the ratio is 1 and no maxima or minima in the reflectivity will be observed. As mentioned above, for indices in which $n_s > n_f$, the reflectivity R as a function of wavelength ($\lambda$) will vary according to equation (1), illustrated by curve 10 in FIG. 1. The response for $n_f > n_s$ will be explained following a detailed description of the invention. Presently available instruments record such a reflectivity curve and, from the observed maxima and minima positions, such as points 10a and 10b of curve 10 in FIG. 1, compute the thickness of the film. It is clear from equation (1) that the film refractive index ($n_f$) must be known. However, if the film index ($n_f$) is not known, measurements can be made from test light beams oriented at two different angles of incidence to the film from which the film index $n_f$ may be determined in a manner known in the art.

In many practical cases the index $n_f$ is known. Even if the index $n_f$ is not known, it is, in many cases, sufficient to measure merely the optical thickness of the film, where the optical thickness is defined as the product $n_f t_f$. According to the embodiment of the invention to be described, the optical thickness is not measured according to the reflectivity curve 10 of FIG. 1 as described above, but rather is measured by using the total intensity (I) of light, having a plurality of wavelengths, reflected successively from a variable standard (having an optical thickness $n_l t_l$) and from the unknown film (having an optical thickness $n_f t_f$). The means by which this is achieved is illustrated in the schematic of FIG. 2.

Figure 2:
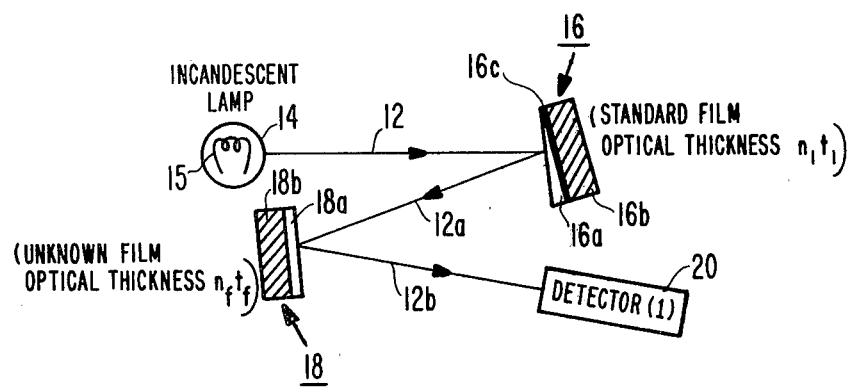
FIG. 2 is a simplified block schematic of an apparatus for determining the optical thickness of a thin film according to the invention.
Figure 5A:
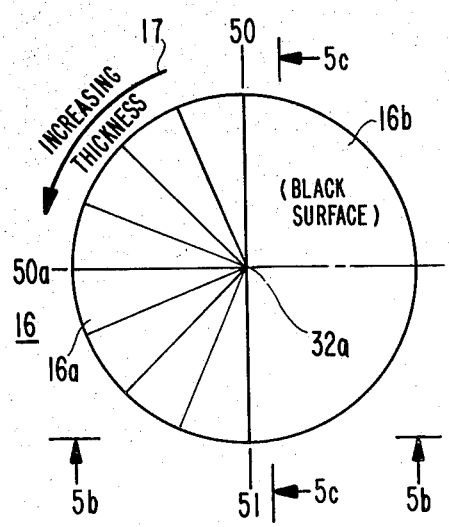
FIGS. 5a, 5b and 5c are plan, side and sectional views, respectively, of the standard or reference thin film (16) of FIGS. 2 and 4.
Figure 5C:
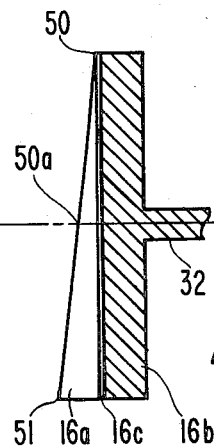
Figure 5B:
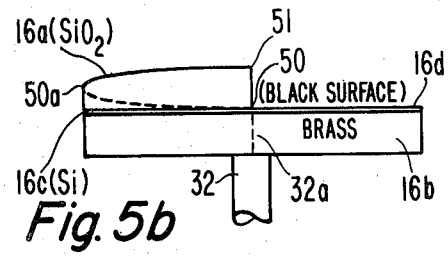

In FIG. 2 light 12, suitably conventional "white" light from an incandescent source 14, having a filament 15, after reflection from a standard or reference thin film 16, will have an intensity (I) as a function of wavelength (λ) of the form of the curve 10 of FIG. 1. The light 12 is reflected as beam 12a from the thin film surface of standard 16 to the surface 18a of an unknown specimen film 18 as beam 12a and thence reflected as beam 12b to a detector 20. Standard film 16 is formed of a thin film 16a having a variable thickness, preferably varying linearly, attached to a substrate 16b. A preferred procedure for making such a standard film as shown in FIGS. 5a–5c will be described hereinafter. The unknown specimen film 18 is formed of a thin film 18a of one material attached to a substrate 18b of a different material.

A light source having a plurality of wavelengths is needed to practice the invention. A preferred form of such a light source is an incandescent lamp providing so-called "white" light, spanning the wavelength range of roughly 4,000–30,000 Å. A narrower wavelength range degrades the performance of the device.

If the optical thickness $n_l t_l$ of the standard film 16 is the same as the optical thickness $n_f t_f$ of the unknown film 18, then the set of wavelengths strongly reflected from the standard 16 (caused by the film/air and film/substrate interfaces mentioned earlier) will be equal to the set of wavelengths $\lambda_p$ strongly reflected from the unknown film 18. Thus, the detector 20 will measure a maximum intensity (I). By being "strongly reflected" is meant that peaks or maxima occur as at points 10a, 10c and 10d of curve 10 of FIG. 1. The corresponding wavelengths of these maxima define the set of wavelengths mentioned above. As the optical thickness $n_l t_l$ of the standard film 16 is suitably changed (in a manner that will be explained), the two sets of strongly reflected wavelengths are no longer identical. For a suitably small change in the optical thickness of the standard film 16, the set of wavelengths strongly reflected from the standard will fall close to wavelengths of minimum reflectivity for the unknown and so lead to a minimum in the intensity I measured by detector 20. For larger changes in the optical thickness of the standard there is no general coincidence of the wavelengths of maximum reflectivity of the standard with wavelengths either of maximum or minimum reflectivity of the unknown. The intensity I is therefore substantially constant at a value intermediate between the value at the maximum and the value at the two neighboring minima. This phenomenon is illustrated in the curve shown in FIG. 3. It should be emphasized that the substantially constant intensity for unequal optical thicknesses will only occur if both the light source covers a large range of wavelengths and the detector has uniform sensitivity over this wavelength range.

Figure 3:
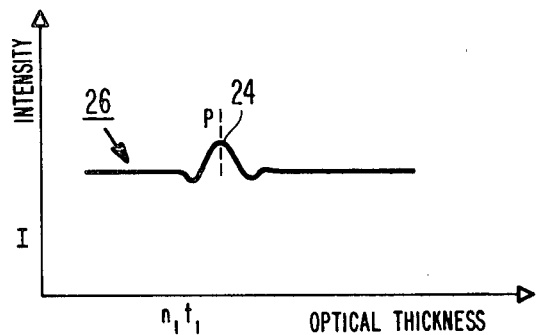
FIG. 3 is a curve plot of the intensity of reflection as a function of optical thickness of a thin film.

In FIG. 3 the response curve 26 of the light reflection intensity (I) as a function of the optical thickness ($n_l t_l$) is shown to be substantially constant except where the value at point (p) 24 increases to a maximum. When the maximum reflected intensity (I) at point 24 is observed, then the unknown film (18) and the standard thin film (16) will have the same optical thickness nt.

In order to scan the reference optical thickness $n_l t_l$, a standard film (16) having a variable thickness is needed. Such a variable thickness standard is constructed, for example, in the form of a wedge of silicon dioxide ($SiO_2$) on silicon (Si) as will be described.

Figure 4:
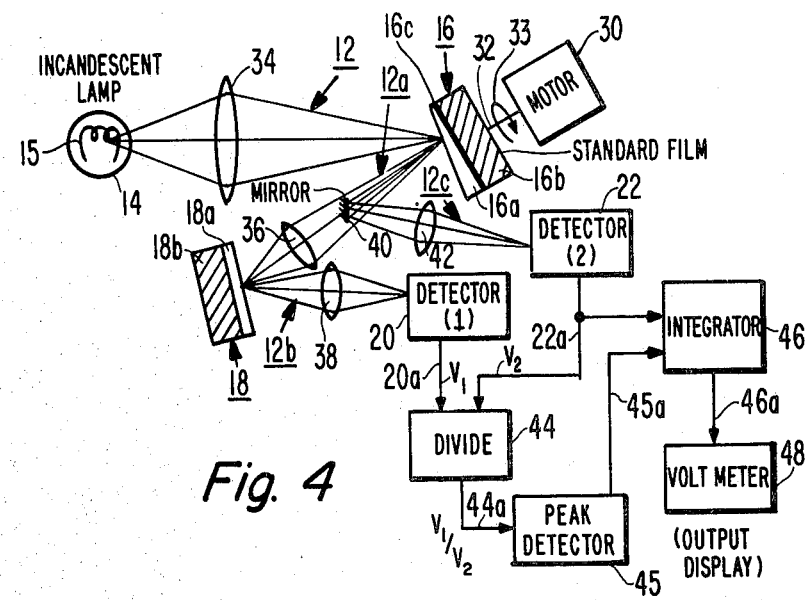
FIG. 4 is a schematic of an apparatus embodying a preferred embodiment of the invention.

The rectangular filament 15 of an incandescent lamp 14 is imaged in the form of a rectangular spot about $1 \times 3$ mm² onto the wedge of thin film 16a at nearly normal incidence as shown in FIGS. 2 and 4, i.e., $\theta \leq 15°$ in equation (1). The reflected light 12a is again imaged onto the unknown film 18a in a spot about $2 \times 6$ mm² and reflected from there to a first detector 20. The wedge of silicon dioxide wafer 16a is generally formed on a flat semicircular shaped silicon substrate 16c as shown in FIGS. 5a, 5b and 5c. The semi-circular substrate 16c is attached to a flat circular metal disc 16b which, in turn, is attached to a motor shaft 32 of a motor 30. The motor rotates the shaft in the direction of arrow 33 and thereby rotates standard thin film 16a. The thickness of the thin film wedge 16a increases linearly with rotation angle from zero thickness up to a few μm (microns) thick as indicated by the arrow 17 in FIG. 5a.

The wedge 16a is a circular ramp formed by suitably etching an oxidized silicon wafer 16c having an oxide thickness of a few microns (e.g. 3–5 μm) corresponding at least to the maximum desired thickness of the wedge 16a. The etching step is performed with a semi-circular silicon wafer 16c of about 10–12 mils thick, mounted on a Teflon disc similar to the metal disc 16b shown in FIGS. 4 and 5a, 5b and 5c. The disc is mounted in a vertical plane with its central axis 32a lying in the surface of the etch, the semi-circles of silicon (16c) and of silicon dioxide 16a lying entirely out of the etch. It should be understood that the axis 32a will be coincident with the shaft axis 32 of FIG. 4 described above. By slowly rotating the disc 16 the silicon (16c) and silicon dioxide (16a) portions pass into the etch and silicon dioxide is removed at a constant rate. The rotation of disc 16 is continued a half turn until points 50 and 51, representing the minimum and maximum thicknesses, respectively, are level with the surface of the etch. In this position the silicon 16c is completely immersed in the etch. The etch will have removed nearly all the silicon dioxide (16a) on the parts of the wafer which first entered the etch (as at point 50) while the last part of the wafer (as at point 51) has only just entered the etch. The thickness of the silicon dioxide varies therefore, linearly with the angle of rotation, the radius to point 50a being at half the thickness. Etching is continued with the wafer fully immersed in the etch until the initial part of the semi-circle, point 50, has been etched through to the silicon substrate 16c. Thus, the wedge starts with a zero thickness.

Figure 6:
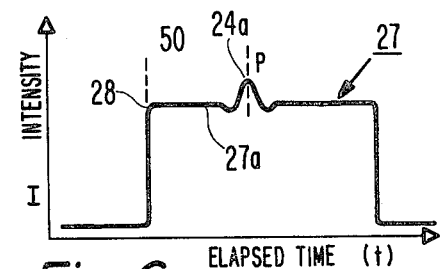
FIG. 6 is a curve plot of the response of the thickness monitor illustrated in FIG. 4.

Consider now a rotation of the wedge 16a, starting with the light 12 incident on the beginning 50 of the wedge (zero thickness). The thickness of the standard will now increase linearly with rotation angle. At the rotation angle where the standard thickness $n_l t_l$ is equal to the unknown thickness $n_f t_f$, a maximum intensity will be measured by detector 20. The thickness of the unknown is thus determined by the angle through which the disc has turned from the starting point until the position at which the maximum is observed. In practice, since the disc rotates at a uniform rate, it is easier to measure rotation angle in terms of elapsed time. Thus the unknown film thickness can be determined by measuring the time elapsed between the start when the light 12 falls on the beginning of the wedge, and the time when the maximum intensity is observed. When the light 12 falls on the black painted part (16b) of the disc the intensity measured by detector 20 falls essentially to zero. The intensity measured during one rotation of the disc will therefore appear as shown in FIG. 6. The beginning of the scan is determined by the steeply rising flank, point 50, at which point in time the light 12 falls on the beginning (50) of the wedge (zero thickness).

It might be expected that replacing the unknown film 18 with a normal mirror would produce a signal at detector 20 showing no maximum, such as maximum peak (P). However, the total reflected intensity (I) from the wedge 16a is not entirely constant as a function of thickness, but shows some variation when the wedge thickness is less than 3,000 Å which variation might mistakenly be interpreted as a peak. To avoid this possibility, a second detector is provided to measure a fraction of the light reflected from the wedge 16a. The embodiment for providing the second detector is illustrated in FIG. 4. A normal mirror 40 is positioned in the path of reflected beam 12a and passed through a lens 42 to a second detector 22. The light from lamp 14 is passed through a lens 34 reflected from the standard wedge 16a through lens 36 onto the unknown film 18. The reflected light 12b is passed through lens 38. The standard film 16 is rotated by shaft 32 by motor 30. Detectors 20 and 22 responsive to incident light, generate, respectively, voltages $V_1$ and $V_2$ which are applied to a divider 44 by leads 20a and 22a. Divider 44 output is constant provided that the light intensity falling on detector 20 has a constant ratio to the intensity falling on detector 22; this is the case when the unknown is replaced with a mirror. Thus the intensity variation for a wedge thicness under 3,000 Å does not appear at the output of divider 44. However, the peak P of FIG. 6 appears only in the output of detector 20 and so the divider 44 output will also show this peak. Divider 44 applies a signal to peak detector 45 via path 44a representing the ratio of the detector signals $V_1/V_2$. The steeply rising flank of the voltage $V_2$ from detector 22, occuring when the light 12 first falls on the beginning of the wedge, is used to start a current integrator 46 which is stopped by the output of peak detector 45 via path 45a. The output of current integrator 46 is coupled to a voltmeter 48 via path 46a. The divided output signal from divider 44 coupled to the peak detector 45, provides a signal which shows only the desired peak P without spurious intensity variations.

The elapsed time between the points 50 and 24a as shown in FIG. 6 is measured as follows, using the apparatus of FIG. 4. The output of current integrator 46 is set to zero output during the part of the rotation of standard film 16 preceding point 50. At point 50 triggered by detector 22, a constant current is fed to the integrator 46, which thereby provides an output voltage increasing linearly with the time elapsed since point 50. The peak P at point 24a is detected by peak detector 45 which switches off the current source via path 45a to the integrator 46. The voltage then present at the integrator 46 output then stays constant and is a measure of time interval between point 50 and point 24a. This time interval is a measure of the film optical thickness of the unknown film 18. Voltage meter 48, suitably of the digital type, may be used to give a direct readout of the optical thickness. Other forms of output displays may be used. For example, a potentiometer may be provided at the output of integrator 46 suitably calibrated in terms of the refractive index $n_f$ so that the digital voltmeter 48 reads out directly the actual film thickness, provided the index $n_f$ is known, as explained hereinabove.

It is important that the detectors 20 and 22 have a broad wavelength response covering the range of 4,000 to 30,000 Å so that as many wavelengths $\lambda_p$ defined above by equation (1) are measured as possible. If the wavelength response of the detectors is too narrow, subsidiary peaks will be observed almost as intense as peak P (point 24 of FIG. 6) causing uncertainty in the measurement.

An apparatus constructed as described above has been found to operate excellently for film thicknesses $n_f t_f$ in the range of 1,500 to 30,000 Å. The upper limit, namely 30,000 Å, can easily be extended by the use of a thicker wedge 16a (FIG. 5). The precision of the readout is in the order of ±10 Å, with an accuracy determined primarily by the linearity of the wedge. The linearity of a wedge is easily made better than 2%. In the practice of measuring films according to the invention, the films are preferably transparent, at least for one half of the range of wavelengths measured, that is, wavelengths in the range of 4 k to 30 k Å.

It should be understood that in the description hereinabove given, it has been assumed that the refractive index $n_f$ of the film to be measured is less than that of its substrate $n_s$. If the opposite is true, that is, if the substate index is less than the refractive index $n_f$, the maxima of equation (1) becomes minima for the film (18) to be measured. Thus, the peak P of FIGS. 3 and 5 becomes a minimum. For such a condition it should be understood that the peak detector circuit 45 of FIG. 4 must therefore be arranged to detect a maximum if $n_f < n_s$ and a minimum if $n_f > n_s$. The condition by which a maximum or minimum of the intensity signal P is established as just discussed, it should be understood, refer to the particular embodiment in which the standard film (16a) is formed of a low refractive index material on a higher index of refraction material for the substrate (16c). In more general terms, it should be appreciated that a maximum in the total intensity of the reflection signal will occur when the difference in the respective refractive indices of the standard or reference film and its substrate has the same algebraic sign as the difference in the respective indices of refraction of the specimen film and its substrate. Moreover, a minimum in the total intensity reflection signal will occur when the difference in the respective refractive indices of the standard or reference film and its substrate has the opposite algebraic sign as that of the specimen film and its substrate.

The kinds of films that can be measured in the practice of this invention comprise, for example, silicon dioxide ($SiO_2$) on silicon (Si); silicon on sapphire (SOS); photoresist on chromium; and titanium oxide ($TiO_2$) on glass. In general, the invention is useful for films on substrates that satisfy the following requirements:

(1) the film thickness must be uniform over the area measured;

(2) the substrate must be smooth enough that specular reflection occurs for wavelengths greater than 1 μm— these may nonetheless appear rough to the eye;

(3) substrate reflectivity should be less than about 70%. For higher reflectivity the amplitude difference for the maxima and minima of FIG. 1 becomes very small and correspondingly peak P, FIG. 3, becomes difficult to observe;

(4) for transparent or partially transparent substrates, reflection from the rear surface of the substrate should be avoided, for example, by roughening the surface;

(5) films should be transparent over at least half of the wavelength range of 4,000 Å to 30,000 Å; and (6) for films on dielectric substrates, the refractive indices $n_f$ and $n_i$ should differ by 10% or more, otherwise, as in (3) above, the peak P becomes difficult to observe.

Various modifications of the preferred embodiment illustrated by FIGS. 2 and 4 will be apparent in view of the above description. For example, while the standard or reference film 16a formed on silicon dioxide on a substrate 16 of silicon provides a preferred film that is transparent to the light to provide the desired varying optical thickness, other transparent dielectric materials on a reflecting substrate may be used.

Nevertheless, while the preferred form of the invention utilizes a transparent dielectric for the reference film, a semiconductor material such as silicon on a substrate of sapphire may be used even though the silicon is transparent only at wavelengths greater than 1.1 microns (11,000 Å). The use of semiconducting material, however, reduces the bandwidth and thereby degrades the performance of the instrument. It is to be understood that metallic film for the specimen or reference film would render the monitor inoperable since the metal would absorb the light and thereby not be able to provide the required interference reflections as described hereinabove.

Moreover, while the preferred embodiment provides for a rotating disc carrying a reference film having a varying optical thickness, a linear wedge of a reference film may be reciprocated linearly under a beam of light to provide the varying optical thickness standard. Accordingly, in order to provide relative motion between the light beam and a reference film of varying thickness, the light beam is fixed and the film is moved to effect a linear or rotational scan by the light beam. In the alternative, the reference film may be fixed and the beam scanned over the surface of the reference film.

Moreover, while the preferred form of the invention provides for reflecting the light beam in sequence first from the reference or standard film and thence from the specimen or unknown film for subsequent detection by the detector, the light beam can be applied first to the specimen film and then to the reference film for reflection to the detector. In other words, the order in which the reflections occur is not critical in the practice of the invention.

In a still further embodiment of the invention to achieve the variable optical thickness for the reference or standard film, one can utilize a Fabry-Perot interferometer. In such a form of a reference film the spacing between a pair of mirrors of the interferometer is changed to effect the required varying optical thickness. See, for example, my U.S. Pat. No. 3,729,261 entitled "STABILIZED MULTI-PASS INTERFEROMETER." FIG. 1 of that patent illustrates the mirrors that can be used to provide the variable optical thickness film in the practice of the present invention. See also, "Fundamentals of Optics," by Jenkins and White, Second Edition, 1950, pp. 264–265, particularly FIG. 14I for a detailed description of such an interferometer. It should be understood that the spacing between the mirrors can be filled with air or made into a vacuum, either such dielectric being transparent to light according to the principles of the present invention. In the use of the invention, embodying an interferometer as the reference, the light beam will be fixed, the scanning of the varying optical thickness being effected by varying the gap of the mirrors.

While the preferred range of the light source in the practice of the invention is in the order of 4000–30,000 Å to monitor specimen films having optical thicknesses greater than about 2000 Å, the light range can be extended to reduce the lower limit of thickness measurements. For example, by the use of a quartz lamp and quartz optics, the range of light can be extended to be as low as 3000 Å. By such a light wavelength extension, the optical thickness of the film to be measured can be as thin as 1500 Å.

It will now be appreciated from the above description that the present invention for determining rapidly and accurately the optical thickness of a thin film is based on the principle of detecting the maximum value of the total intensity of the successive reflections from the standard having a varying optical thickness and the specimen of unknown optical thickness. This principle is distinguished from the above-identified U.S. Pat. No. 2,655,073 in which the thickness is determined by the observation of interference fringes formed from a standard having a fixed optical thickness.

What is claimed is:

1. A thin film thickness monitor comprising:
   a source of light for a light having a plurality of wavelengths;
   a light detector for generating an output signal indicative of detected light;
   a reference thin film of varying thickness having a known optical thickness $n_i t_i$ that varies with the thickness of said film, where $n_i$ is the refractive index of said film and $t_i$ is the thickness at a particular portion of said film;
   a specimen thin film of unknown optical thickness $n_f t_f$ where $n_f$ is the refractive index and $t_f$ is the thickness;
   means for scanning light from said source in either successive order over the surface of said reference film, and reflecting said scanned light to the surface of said specimen film and thence to said detector, the output signal of said detector representing the intensity of said reflected light, a variation in the intensity of said reflected light being indicative of the optical thickness of said reference film and said specimen film being equal;
   said reference thin film comprising a semi-circular member supported on a circular disc, whereby a semi-circular surface portion of said disc adjacent said member is scanned by said light, the thickness of said member varying circumferentially linearly between a minimum thickness and a maximum thickness; and further including:
   means responsive to said output signal for determining the optical thickness of said film as a function of the scanning time or distance between either the minimum thickness or maximum thickness of the member and the thickness of the member at which the variation in the reflected light intensity occurs.

2. The monitor of claim 1 wherein said light source is an incandescent lamp.

3. The monitor of claim 2 wherein said specimen thin film is silicon and said substrate is sapphire.

4. The monitor of claim 2 wherein said specimen thin film is a photoresist and said substrate is chromium.

5. The monitor of claim 1 wherein said disc is mounted on a motor driven shaft and is oriented so that the angle of incidence of said light on the surface of said reference film is substantially normal.

6. The monitor of claim 1 wherein the surface of said circular disc not covered by said member is black.

7. The monitor of claim 1 wherein said specimen thin film is silicon dioxide and said substrate is silicon.

8. The monitor of claim 1 wherein said specimen thin film is titanium oxide ($TiO_2$) and said substrate is glass.

9. The monitor of claim 1 further including:
a second detector for generating an output signal indicative of a detected light;
a mirror positioned in a portion of the reflected light following reflection from the first scanned film and before reflection from the second scanned film to reflect light to said second detector; and
means responsive to the respective output signals of the first-mentioned detector and said second detector for generating an output signal indicative of the intensity of the reflected light from said specimen and substantially free of distortion in the reflected light signal which would otherwise occur at either very small thicknesses due to the finite bandwidth of the optical system or the reference film thickness being less than the minimum wavelength from the light source.

10. A method of monitoring the thickness of a thin film comprising:
reflecting polychromatic light from a source, in either successive order, from a specimen film of unknown optical thickness and a reference film of variable optical thickness, scanning said light on said reference film, which is comprised of a semicircular member supported on a circular disc, by rotating said disc with respect to said light;
varying the optical thickness of the reference film linearly between a minimum thickness and a maximum thickness;
detecting the intensity of the reflected light to determine when the optical thickness of the specimen film is equal to the optical thickness of the reference film; and
providing a signal representing the optical thickness as a function of the time between either the minimum or maximum thickness and the thickness at which the respective thicknesses are equal.

11. The method of claim 10 further comprising the steps of:
scanning said light initially over said reference film to reflect light subsequently to said specimen film;
reflecting a portion of the reflected light from said reference film to a second detector;
dividing the output signals of the first-mentioned detector and said second detector to generate a signal representing the intensity of said reflected light from said specimen substantially free of spurious reflected signals from said reference film;
detecting an extremum in said divided signal;
generating independently a voltage proportional to the reference film thickness; and measuring said voltage at the time of occurrence of said divided signal maximum; and
displaying a signal representing the value of said measured voltage, said measured voltage being a measure of thickness of said specimen film.

* * * * *